United States Patent [19]
Naff et al.

[11] Patent Number: 5,489,818
[45] Date of Patent: Feb. 6, 1996

[54] HIGH POWER COMPACT MICROWAVE SOURCE

[75] Inventors: John T. Naff, Pleasanton; Siu-Kwong Lam, Dublin, both of Calif.

[73] Assignee: Olin Corporation, San Leandro, Calif.

[21] Appl. No.: 368,855

[22] Filed: May 22, 1989

[51] Int. Cl.$^6$ ............................ H01J 7/46; H03B 5/12; H01P 1/04; H01P 7/06
[52] U.S. Cl. ............. 315/39; 331/107 DP; 333/227; 333/13
[58] Field of Search ............... 315/5, 39; 331/107 DP, 331/96, 97; 333/13, 227

[56] References Cited

U.S. PATENT DOCUMENTS

| | | | |
|---|---|---|---|
| 3,644,779 | 2/1972 | Goldie | 333/13 |
| 4,104,557 | 8/1978 | Proud, Jr. | 315/39 |
| 4,656,430 | 3/1987 | Olson | 315/39 |

OTHER PUBLICATIONS

H. Keith Florig, "The Future Battlefield: A Blast of Gigawatts", IEEE Spectrum, Mar. 1988, pp. 50–54.
R. K. Parker et. al., "Radio–Frequency (RF) Vacuum Electronics: a resurgent technology for Tomorrow" SPIE Proc. vol. 791.

*Primary Examiner*—Gregory C. Issing
*Attorney, Agent, or Firm*—Gregory S. Rosenblatt; John R. Wahl

[57] ABSTRACT

A method of generating high-power microwaves from a compact source is disclosed by which a transmission line cavity resonator is charged to a high voltage and an electrical switch in the resonator is closed very quickly to produce subnanosecond current risetime and a resultant high-power microwave pulse. Structure to accomplish the method is also disclosed.

23 Claims, 2 Drawing Sheets

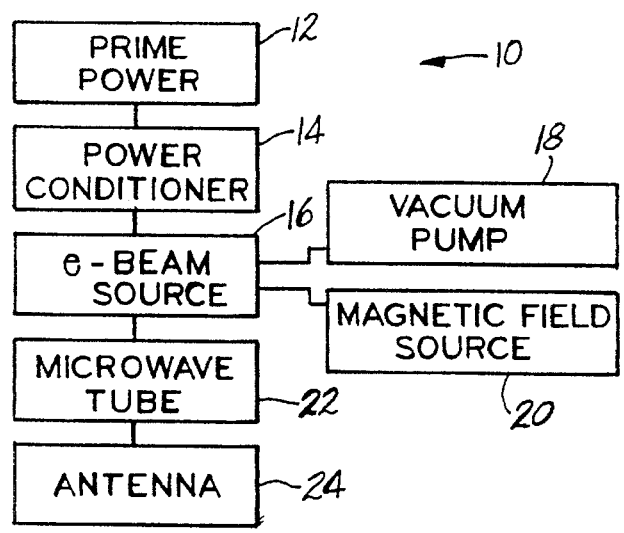
FIG-1
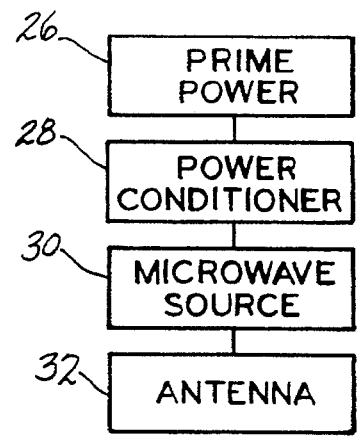
FIG-2
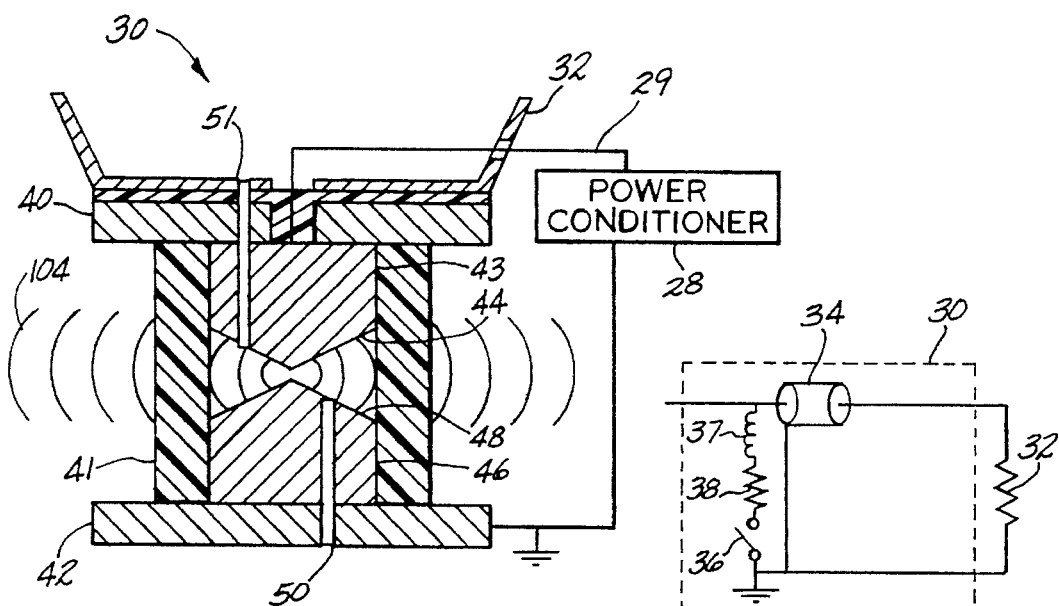
FIG-3
FIG-4

HIGH POWER COMPACT MICROWAVE SOURCE

This invention relates to microwave generators and specifically to high-power microwave generators.

Conventional microwave generation units have ranged from small low-power units such as in microwave ovens to very large high-power units such as in large test labs, each with microwaves generated by electron beam excitation of a microwave generation tube. All existing high-power microwave units (above 100 MW power) use field emission to produce the electron beams, requiring fields of typically ⅓ to 1 MV. Conventional units capable of sufficient power (over 100 MW) to burn out or upset electronic military systems have typically taken up at least about 200 cubic feet (more typically 2000 cubic feet) and weighed in excess of a ton (more typically 0.10 tons) due to the need for a vacuum region and (usually) a magnetic field to guide the beam as well as the magnetic field to create the emission and require power sources of up to 10 GW capacity, thus making them impractical for most military operations. There is a military interest in reducing the size and power requirements of high-power microwave units for military applications to allow them to be mounted on vehicles, small boats and planes, and missiles. A fresh approach to microwave generation is needed to achieve such size reductions.

The present invention gives this fresh approach to the above need by providing a compact high-power microwave generator using very high speed switching of an electrically charged resonator circuit to achieve a direct conversion from pulsed power to microwaves with no intervening medium.

"Compact" as used herein means having a volume less than about 100 cubic feet.

"High power" as used herein means total radiated microwave power greater than about 100 MW.

"High speed switching" as used herein means closing a switch sufficiently fast that the current risetime (duration of resistive phase) of the switch is less than 1 ns.

"High voltage" as used herein means in excess of 100 kV.

The present invention eliminates the electron beam tube of prior microwave generators by generating the microwave pulse directly in the switch through very high speed switch closure of a highly charged resonant circuit.

The source is preferably coupled to an antenna so that the microwaves generated can be directed at a desired target. The generation of the microwaves in the switch itself should result in substantially higher efficiencies of up to 50% rather than the conventional efficiencies of 10 to 15% (or less) for prior electron-beam-based systems. This higher efficiency can be expected because there is no requirement to provide a magnetic field or a vacuum region and no X-radiation is produced.

The invention will be better understood by reference to the attached drawings in which:

FIG. 1 is a schematic diagram of a conventional prior-art microwave generator.

FIG. 2 is a schematic diagram of a microwave generator of the present invention.

FIG. 3 is an axial cross-sectional view of a microwave source of the present invention.

FIG. 4 is an equivalent electrical circuit diagram of a preferred microwave generator, which includes the microwave source of FIG. 3.

Figure 5:
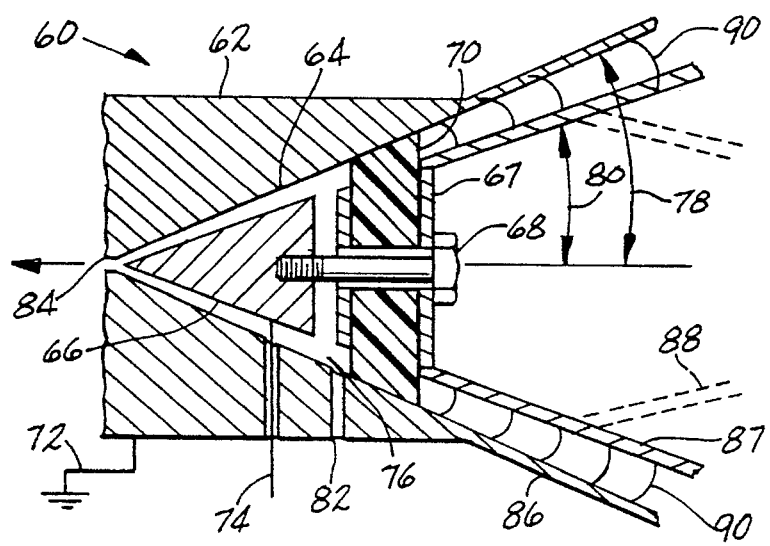
FIG. 5 is an axial cross-sectional view of a second microwave source of the invention.

Referring now to FIG. 1, a conventional microwave generator (10) is shown comprising typically a prime power supply (12), a power conditioning unit (14), an electron beam source (16), a vacuum pump system (18), a magnetic field source (20), a microwave tube (22), and an antenna (24). The prime power supply (12) provides the electrical current to drive the generator (10) and supplies this current to a power conditioner which converts the energy supplied by the power supply into the proper form for powering the electron beam source (16), which supplies electron beams to a microwave generation tube (22), which is in turn coupled to an antenna (24) to direct the generated microwaves. Such a unit is conventional in the pulsed power field. Typical of such units are the "Camel" and "Camel-X" facilities of Physics International Company at San Leanalto, Calif.

The conventional electron beam source supplies electron beams by field emission techniques, which require a vacuum and a strong magnetic field, both of which, in turn, require sizable pieces of equipment and introduce inefficiencies into the system. Referring to FIG. 2, the present invention eliminates the electron beam source and instead provides a microwave generation unit which comprises a prime power source (26), a power conditioner (28), a compact microwave source (30), and an antenna (32). It is with the microwave source (30) that the present invention is primarily concerned.

Referring to FIGS. 3 and 4, the source (30) is a transmission line cavity resonator (34) having the capacity to hold a charge of greater than 100 kV with an output switch (36) therein. The output switch (36) can be any device which will withstand high voltage and close quickly (subnanosecond) when required to do so, and which has very low circuit inductance (37) and a very low closed resistance (38).

The structure of FIG. 3 and its equivalent electric circuit (FIG. 4) illustrate how this is accomplished in the present invention. The source (30) comprises a biconical wave launcher which has a disk-like metallic top plate (40) and bottom plate (42) in coaxial spaced parallel relationship. An insulative plastic tube (41) is positioned between plates 40 and 42. A first upper cylindrical metallic conductor body (43) with a downwardly tapered conical lower surface (44), and a second lower cylindrical metallic conductor body (46) with an upwardly tapered conical upper surface (48) are disposed within the tube (41) in a coaxial spaced relationship with the apex of their cones adjacent each other. The distance between the apexes of the conical surfaces (44) and (48) is selected to provide a desired spark gap. The upper conductor body (43) is electrically connected to the output of power conditioning unit 28 while the lower conductor body (46) is electrically connected to ground through plate 42. Plates 40 and 42 are held tightly against tube 41 by suitable fasteners (not shown) so that an enclosed and sealed chamber is formed bounded by the plates (40 and 42) and the plastic tube (41). This chamber is filled with a flowing dielectric medium introduced through an inlet passageway (50) in conductors 42 and 46 and removed through an outlet passageway (51) in conductors 40 and 43.

A conical grounded antenna (32) is attached to the top of top plate 40. Suitable materials for the source (30) are: for top and bottom plates 40 and 42, brass, stainless steel or aluminum; for antenna 32, aluminum or copper or other lightweight conductive metal; for tube 41, ULTEM plastic, nylon or other high strength homogeneous plastic; for the tip of bodies 43 and 46, a high-temperature, high-strength metal such as tungsten alloy.

Figure 6:
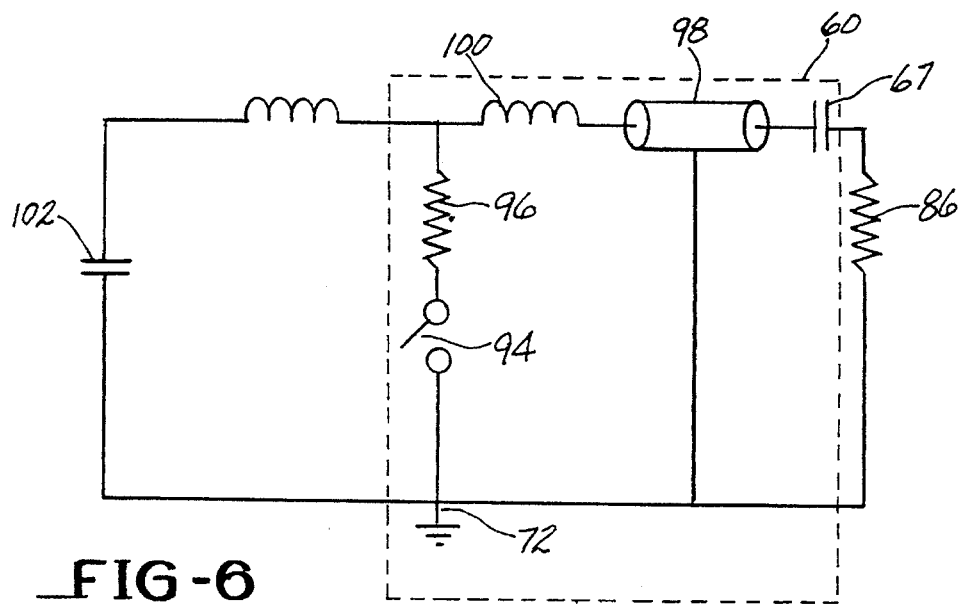
FIG. 6 is an equivalent electrical circuit diagram for a microwave generator, which includes the source of FIG. 5.
Figure 7:
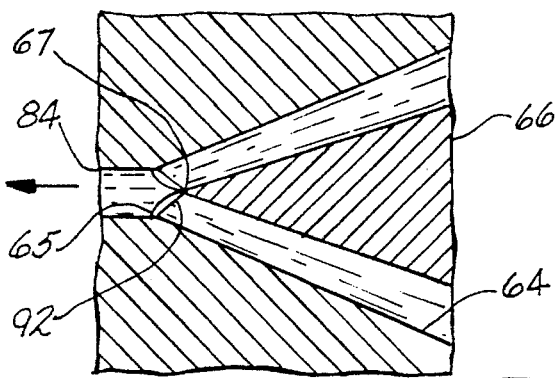
FIG. 7 is an enlarged view of the conical apex region of FIG. 5 showing switch closure.

Referring next to FIGS. 5, 6, and 7, a second preferred compact source (60) is shown in axial cross-section. Source 60 comprises a conductive metallic main body (62) having an open external conical recess (64), a resonator cavity cone (66), a capacitive antenna coupler (67) with fastener (68), a seal (70), an electrical ground connection (72), an electrical power lead (74) and a liquid dielectric medium in a resonator cavity (76) between cone 66 and recess 64. Recess 64 has a cone angle (78) (which is slightly greater than the cone angle (80) of resonator cone 66) that defines a tapered conical space (cavity 76) therebetween, having its minimum thickness at the apexes (65 and 67) of conical recess 64 and resonator cone 66, respectively. Main body 62 includes an inlet passageway (82) and outlet passageway (84) in fluid communication with the resonator cavity (76). Attached to cone 66 through capacitive antenna coupler 67 is an antenna of any suitable design such as the biconical antenna (86) (shown in solid) which can have a straight conical inner cone (87) (shown in solid) or a tapered inner conical antenna (shown in phantom). In operation, source 60 operates to produce one or more microwave pulses (90) in a manner described below. The region of apexes 65 and 67 is shown enlarged in FIG. 7 during spark generation (switch closure). During closure a spark (92) is generated between apexes 65 and 67 (the distance between apexes 65 and 67 is called a "spark gap") through the dielectric medium therebetween, which is a pressurized fluid such as a high pressure gas, mineral oil, or some other suitable liquid. This spark is of such high voltage and current that it would damage the medium if done repetitively and thus renders repeated operation of source 60 less effective unless the medium is replaced between shots. Outlet 84 and inlet 82 allow the damaged medium to be replaced between shots and thereby allow repeated switch closings to occur with relatively the same efficiency and power. The source (60) can be depicted by the equivalent circuit of FIG. 6 in which source 60 is that portion enclosed in a dotted line. The source can be seen as an open switch (94) with a closed switch resistance (96) electrically connecting (upon switch closure) a charged inner terminal (66) of resonator 98 (having a characteristic inductance (100)) to ground via ground connection 72. The outer surface of the resonator (98) is also grounded through ground connection 72. The inner terminal (66) of resonator 98 is also electrically connected through a capacitive antenna coupling (67) to a grounded antenna (86) of a predetermined resistance. The inner core (66) of resonator 98 is also electrically connected to the charged terminal of a driving capacitor (102) (having a characteristic inductance (104)). The other terminal of driving capacitor 102 is connected to ground. The preferred electric values for the components of the circuit of FIG. 6 are:

| | |
|---|---|
| Capacitor 102 | 250 kV, 270 pF |
| Inductance 104 | 400 nH |
| Resistance 96 | 0.25 ohms |
| Inductance 100 | 0.5 nH |
| Capacitor 67 | 5 pF |
| Resistance 86 | 50 to 70 ohms |
| Terminal 66 | 3 to 10 ohms |

The operation of the compact source is best understood by considering the following descriptions. The circuit shown in FIG. 4 and FIG. 6 produces dampened sinusoidal electromagnetic wave pulses when switches 36 and 94, respectively, are closed. Typical spark-gap switches have an inductance of about 15 nH, the inductance being determined by switch geometry, particularly the length of the switch plasma column when the switch is closed. The biconical geometry of the switches (36) and (94) of sources 30 and 60 reduce this inductance by an order of magnitude to under 1.5 nH and preferably to about 0.5 nH by reducing the length of spark gap an order of magnitude through the use of a pressurized fluid dielectric medium in the spark gap. This pressurized fluid, which is preferably a liquid such as mineral oil, can maintain a high voltage (i.e., in excess of 100,000 volts) prior to a spark forming across the gap. Also, the resistance of the dielectric medium is low once the gap forms (0.25 ohms in source 60). The biconic spark gap switches of sources 30 and 60 also serve an additional advantage by minimizing the area of the maximum electric field stress to just the portion of the gap adjacent the apexes of the cones (see FIGS. 3, 5, and 7). The most important aspect of switch performance is the pulse overvoltage of the switch. Spark gap switches exhibit time-dependent breakdown, so the present invention pulse-overvolts the dielectric very quickly, thereby allowing the dielectric to sustain a very high voltage. It has been found that liquid dielectrics' time to breakdown (t) as a function of electric field (E) is given by the relationship:

$$Et^{1/3} = \text{constant}$$

while for pressurized gas dielectrics the relationship is:

$$Et^{1/6} = \text{constant}$$

so that liquid dielectrics are favored for the present invention.

Referring again to FIG. 3, the compact microwave source (30) is operated by sending a power pulse from power conditioner 28 through electrical line 29 to upper conductor body 43 to charge body 43. When the apex of the conical surface (44) of the upper body (43) reaches a certain predetermined voltage, the dielectric therebetween will break down and a current pulse will pass to the apex of conical upper surface 48 of lower conductor body 46. Since the biconical configuration of bodies 43 and 46 forms a transmission line resonator cavity, an electromagnetic wave will be generated. The distance between the apexes of bodies 43 and 46 and the dielectric medium are chosen so as to allow the current pulse to have a risetime of less than a nanosecond, and preferably about 250 ps, to cause the generated wave pulse to be in the microwave range and of a very high radiated power. The resonant circuit is sufficiently loaded that the wave pulse is a highly dampened sinusoidal waveform with a frequency in the microwave range.

A 10-stage Marx generator with a storage capacity of 8.5 joules at 250,000 volts output has been found to be a suitable conditioner (28), due to the higher efficiency of the compact source, to achieve high-power microwave pulse production from source 30 or 60. Prime power 26 can be a 30,000-volt, 3-kW, rack-mounted unit or other conventional electrical power unit.

The operation of source 60 is similar to that of source 30, except that source 60 is specially designed for repeated pulsing and is designed for testing power output or directing radiation. The capacitor (102) in FIG. 6 is the power conditioner equivalent. When the resonator (76) stores sufficient charge, the gap closure between the inner and outer cone apexes (65 and 67) will generate a current pulse (92). The configurational geometry of source 60 is such that current pulse 92 will have a risetime of less than a nanosecond so as to generate a high-power microwave pulse (90) between the inner antenna cone (87 or 88) and the outer antenna cone (86). As noted above, the dielectric in cavity 76 is pressurized flowing fluid to give fluid replacement for repeated pulsing.

The cone (66) is pulse-charged to a voltage in excess of 100,000 volts prior to closure of the spark gap switch therein. For the preferred values given for the circuit of FIG. 6, this produces a high-power microwave pulse having a bandwidth of 1 GHz at a gigahertz frequency and a peak power of 1 GW. The inclusion of a capacitive antenna coupling (67) results in the measured electromagnetic wave pulse having a prepulse of a magnitude less than 10% of the magnitude of the main pulse. The electromagnetic wave produced by source 60 is a dampened sinusoid, and this wave pulse is guided in a desired path by antenna 86. The pressurized fluid dielectric within resonator cavity 76 during closing of the spark gap switch receives an electric current in excess of 10,000 amperes and is then replaced by fluid dielectric through which the current has not yet passed. The source is then recharged and the spark gap switch reclosed to generate a second high-power wave pulse.

While the invention has been illustrated with FIGS. 1 through 7 showing specific embodiments, it will be understood that these illustrative embodiments may be modified within the scope of the claims below and still fall within the scope of the invention.

What is claimed is:

1. The method of producing microwaves which comprises the steps of:
   a) charging a transmission line cavity resonator to a voltage in excess of 100 kV, and
   b) closing an electrical switch in the resonator in less than a nanosecond to produce an electric pulse in the resonator cavity with a current risetime of less than a nanosecond and to generate a high-power microwave pulse emanating from the resonator.

2. The method of claim 1, wherein the peak magnitude of the generated microwave pulse is over 1 GW and the pulse has a bandwidth of 1 GHz at a frequency of 1 GHz.

3. The method of claim 2, wherein the electromagnetic wave pulse includes a main pulse preceded by a prepulse of a magnitude less than 20% of the magnitude of the main pulse.

4. The method of claim 3, wherein the electromagnetic wave is in the form of a dampened sinusoid.

5. The method of claim 1, further comprising the step of:
   guiding the generated electromagnetic wave pulse with an antenna to restrict the microwave radiation to a desired path.

6. The method of claim 1, wherein the method further comprises the step of:
   disposing a pressurized fluid dielectric within the resonator during the closing of the electrical switch.

7. The method of claim 6, wherein the closing of the switch includes the step of:
   passing an electrical current through the pressurized fluid dielectric at in excess of 100,000 volts.

8. The method of claim 6, wherein the fluid dielectric is a liquid.

9. The method of producing microwaves which comprises the steps of:
   a) charging a transmission line cavity resonator to a voltage in excess of 100 kV,
   b) closing an electrical switch in the resonator in less than a nanosecond by passing an electrical current through the pressurized fluid dielectric at in excess of 100,000 volts,
   c) disposing a pressurized fluid dielectric within a transmission line cavity resonator during the closing of the electrical switch,
   d) replacing the portion of the fluid dielectric through which the current passed with fluid dielectric through which the current has not passed, and
   e) repeating the charging and closing steps to generate a second high-power wave pulse.

10. The method of claim 9, further comprising the step of:
    repeating the replacing, charging, and closing steps at a frequency of at least 10 Hertz to thereby generate multiple high-power microwave pulses.

11. The method of claim 10, further comprising the step of:
    concentrating the generated microwave pulses with an antenna in a desired direction toward a target.

12. A compact microwave source, which comprises:
    a) a transmission line resonator having a resonant cavity,
    b) a spark gap switch within the cavity,
    c) a dielectric medium in the gap of the spark gap switch, the gap of the switch being small enough and the dielectric medium having a sufficient time-dependence as a function of electric field that the switch will not close until a voltage of at least 100 kV is applied across the switch gap but will close in less than a nanosecond when a predetermined voltage in excess of 100 kV is applied across the switch gap.

13. The source of claim 12, wherein the resonator is a conical wave launcher.

14. The source of claim 13, wherein the resonator comprises:
    a) an electrically grounded conductive first body with an open, external, conical recess with an acute cone angle,
    b) a conductive conical second body disposed within the conical recess and having a cone angle less than the cone angle of the first body recess, the first and second bodies being closest together at the apexes of their respective cones,
    c) an electrical conductor leading to the second body, and
    d) a dielectric medium between the first and second bodies.

15. The source of claim 11, wherein the dielectric medium is fluid.

16. The source of claim 15, further comprising: a seal connecting the first and second bodies for confining the fluid medium in the spark gap of the switch and defining an enclosed switch chamber, the seal being electrically non-conductive.

17. The source of claim 16, further comprising:
    a) an inlet passageway in fluid communication with the switch chamber for allowing the fluid medium to be introduced to the switch chamber, and
    b) an outlet passageway in fluid communication with the switch chamber for allowing the fluid medium to be withdrawn from the switch chamber.

18. The source of claim 17, wherein the fluid medium is flowing into the switch chamber from the inlet passageway, through the switch chamber, and out of the switch chamber through the outlet passageway.

19. The source of claim 12 in combination with an antenna electrically connected to the source through a connector having a capacitance within the range of from about 1 to about 10 pF.

20. The source of claim 12, wherein the source has an inductance not exceeding 1 to 10 nH.

21. The source of claim 12, wherein the resonator is a biconical wave launcher.

22. The method of producing microwaves which comprises the steps of:
 a) disposing a pressurized fluid dielectric within a transmission line cavity resonator,
 b) charging said transmission line cavity resonator to a voltage in excess of 100 kV,
 c) closing an electrical switch in the resonator in less than a nanosecond by passing an electrical current through a portion of the pressurized fluid dielectric at in excess of 100k Volts to produce an electric pulse in the resonator cavity with a current rise time of less than a nanosecond and generate a high-power microwave pulse emanating from the resonator, and
 d) replacing the portion of the fluid dielectric through which the current passed with fluid dielectric through which the current has not passed.

23. The method according to claim 22 further comprising the step of repeating the charging, closing, and replacing steps to produce sequential high-power microwave pulses emanating from the resonator.

* * * * *